US011249029B2

(12) United States Patent
Hu et al.

(10) Patent No.: US 11,249,029 B2
(45) Date of Patent: Feb. 15, 2022

(54) ELECTRONIC DEVICE FOR OPTICALLY CHECKING APPEARANCE OF PRODUCT FOR DEFECTS

(71) Applicant: Fu Tai Hua Industry (Shenzhen) Co., Ltd., Shenzhen (CN)

(72) Inventors: Liu-Bin Hu, Shenzhen (CN); Bin Zou, Shenzhen (CN); Zhi-Cheng Huang, Shenzhen (CN)

(73) Assignee: Fu Tai Hua Industry (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 17/000,619

(22) Filed: Aug. 24, 2020

(65) Prior Publication Data

US 2021/0109032 A1    Apr. 15, 2021

(30) Foreign Application Priority Data

Oct. 14, 2019 (CN) .......................... 201910973091.X

(51) Int. Cl.
*G01N 21/88* (2006.01)
*G01N 21/25* (2006.01)
*G06T 7/00* (2017.01)
*G01N 21/95* (2006.01)

(52) U.S. Cl.
CPC ......... *G01N 21/8851* (2013.01); *G01N 21/25* (2013.01); *G01N 21/8806* (2013.01); *G06T 7/0004* (2013.01); *G01N 2021/887* (2013.01); *G01N 2021/9518* (2013.01)

(58) Field of Classification Search
CPC . G06T 7/0004; G06T 7/70; G06T 2207/0004; G01N 21/29; G01N 21/255; G01N 21/8806; G01N 21/8851; G01N 21/25; G01N 2021/8887; G01N 2021/887
USPC ............ 356/237.1–237.5; 382/141, 151, 155
See application file for complete search history.

(56) References Cited

U.S. PATENT DOCUMENTS

| 11,105,754 | B2 * | 8/2021 | Yacoubian | ............... B22F 12/00 |
| 11,156,563 | B2 * | 10/2021 | Hu | ...................... G01N 21/8851 |
| 2020/0333260 | A1 * | 10/2020 | Yamada | ............. G01N 21/8806 |
| 2021/0035276 | A1 * | 2/2021 | Ago | .......................... G06T 7/62 |
| 2021/0109031 | A1 * | 4/2021 | Hu | ...................... G01N 21/8851 |
| 2021/0110528 | A1 * | 4/2021 | Hu | ........................ G06T 7/0004 |

* cited by examiner

*Primary Examiner* — Hoa Q Pham
(74) *Attorney, Agent, or Firm* — ScienBiziP, P.C.

(57) ABSTRACT

An electronic device for optically checking an appearance of a product for defects includes a first checking device checking a plane of a product and a second checking device checking side surfaces of the product. The first checking device includes a first camera device, a second camera device, and first white and red light sources. The second checking device includes a third camera device, at least one second white light source, and at least one second red light source. When the first white light source or the first red light source are activated, the first and second camera device capture at least one image of a plane. When the second white light source or the second red light source are activated, the third camera device captures at least one image of a side surface.

10 Claims, 10 Drawing Sheets

ELECTRONIC DEVICE FOR OPTICALLY CHECKING APPEARANCE OF PRODUCT FOR DEFECTS

CROSS-REFERENCE TO RELATED APPLICATIONS

This application claims priority to Chinese Patent Application No. 201910973091.X filed on Oct. 14, 2019, the contents of which are incorporated by reference herein.

FIELD

The subject matter herein generally relates to defect checking technology, and particularly to an electronic device for optically checking an appearance of a product for defects.

BACKGROUND

In industrial production, appearance checking is important. Wear, scratches, errors, and improper operation can easily cause damage to the appearance of products, and defects such as abnormal colors, stair slope errors, scratches, and sanding marks on side surfaces of the products can occur. Appearance checking is an essential procedure in manufacturing.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
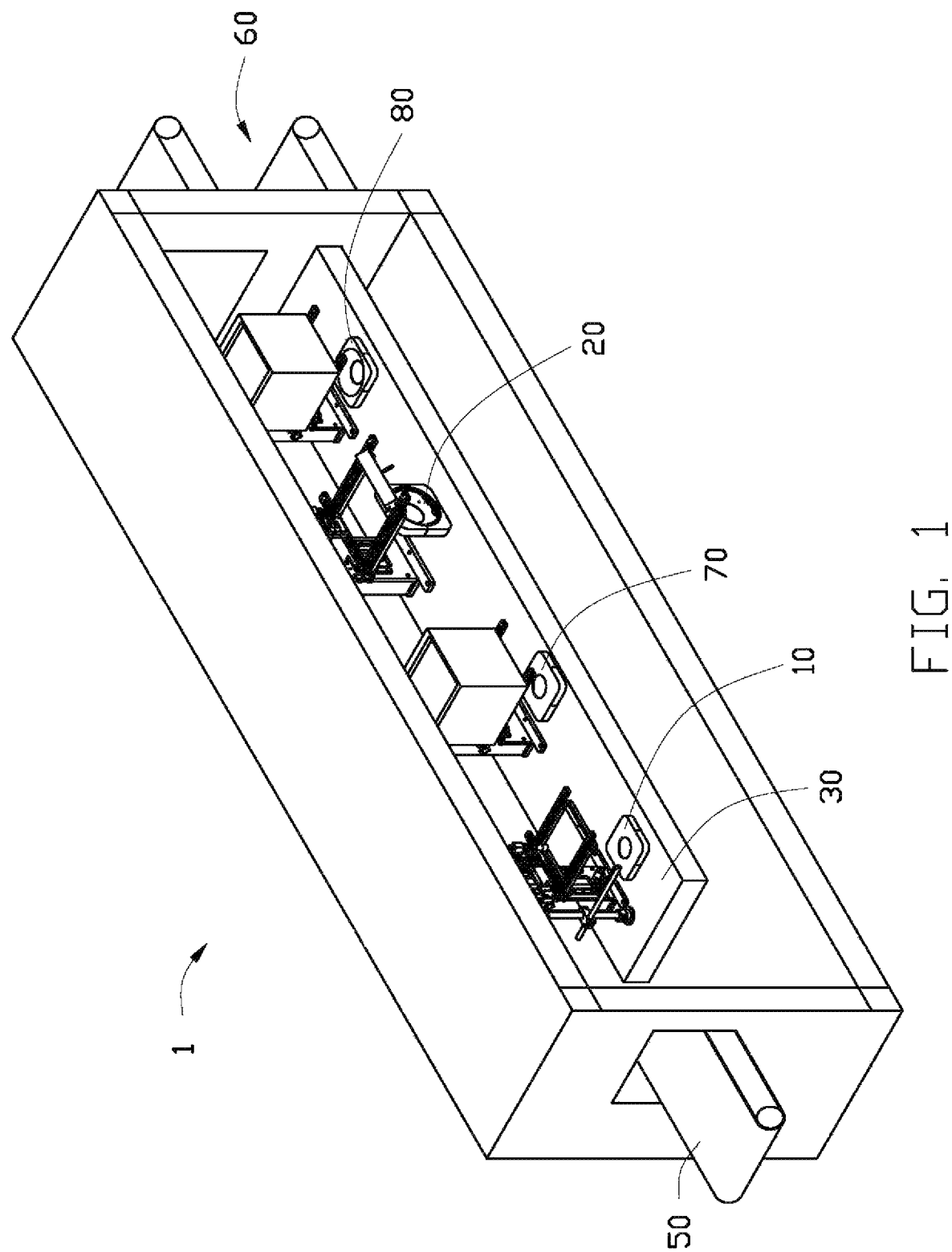
FIG. 1 is a schematic view of at least one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

FIG. 1 illustrates an electronic device 1 in at least one embodiment. The electronic device 1 includes a number of checking devices. The checking devices checks appearance of a plane and side surfaces of a product 2 through at least one camera device for defects. The defects including abnormal colors, stair slope errors, scratches, and sanding marks on the side surfaces, and the defects including stair slope errors, scratches, sanding marks, and gas marks on the plane, may thus be revealed. In at least one embodiment, the product 2 can be a casing, for a terminal device such as a router, a modem, or a TV box.

The gas mark on the plane may be a light gray rectangle, a direction of the gas mark is toward an opening of the product 2. The stair slope error on the plane is generally located at an edge position, and usually highlighted in color. The scratches on the plane are white, and generally in a form of strips and filaments. The abnormal colors on the side surfaces can generally be light gray, and the distribution is irregular. The stair slope errors on the side surfaces are generally located at the edge position and usually highlighted in color. The scratches on the side surfaces of the product 2 are generally in a form of highlighted points.

For example, the gas mark on the plane has a minimum length of 5 mm and a maximum length of 90 mm, and has a minimum width of 2 mm and a maximum width of 50 mm. The stair slope error has a minimum chord length of 1 mm and a maximum chord length of 70 mm. The scratches on the plane has a minimum width of 0.1 mm and a maximum width of 10 mm. The abnormal color on the side surface has a minimum length of 20 mm and a maximum length of 190 mm, and has a minimum width of 3 mm and a maximum width of 30 mm. The stair slope error on the side surface has a minimum length of 2 mm and a maximum length of 40 mm. The scratch on the side surface has a minimum diameter of 0.01 mm and a maximum diameter of 0.03 mm. These defects with above-mentioned sizes may be revealed by capturing and analyzing the images of the plane and the side surfaces of the product 2.

Figure 2:
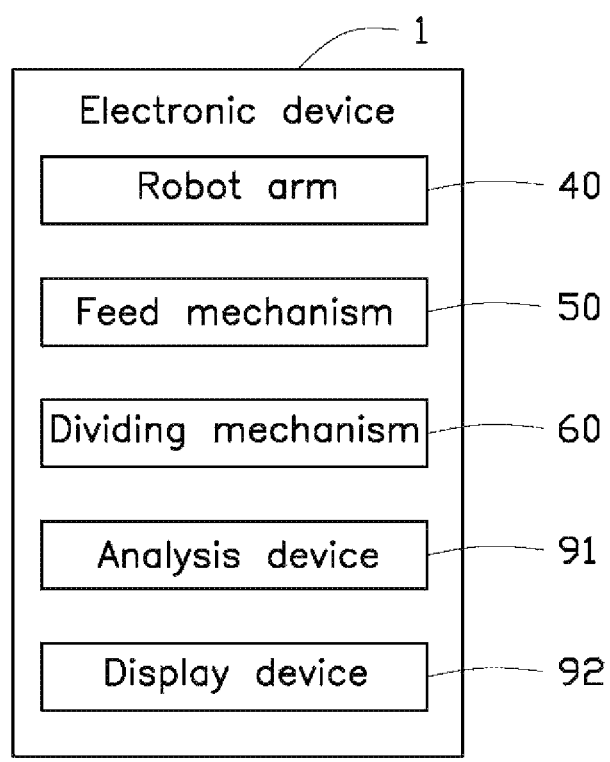
FIG. 2 is block view of at least one embodiment of the electronic device of FIG. 1.

Referring to FIGS. 1 and 2, the electronic device 1 includes, but is not limited to, a first checking device 10, a second checking device 20, an operation table 30, at least one robot arm 40, a feed mechanism 50, and a dividing mechanism 60. In at least one embodiment, the first checking device 10 and the second checking device 20 are arranged on the operation table 30. The feed mechanism 50 and the dividing mechanism 60 are arranged on ends of the operation table 30.

In at least embodiment, the feed mechanism 50 and the dividing mechanism 60 can be conveyor belt. The feed mechanism 50 receives the product 2 to be checked. The robot arm 40 places the product 2 on the first checking device 10 and then the second checking device 20, so that the first checking device 10 and the second checking device 20 can check the appearance of the plane and the side surfaces of the product 2 in turn. When the first checking device 10 and the second checking device 20 are working, the robot arm 40 can further control the product 2 to move to change its posture. The dividing mechanism 60 receives the product 2 which has been checked and transmits the product 2 to a next manufacturing process.

Figure 3:
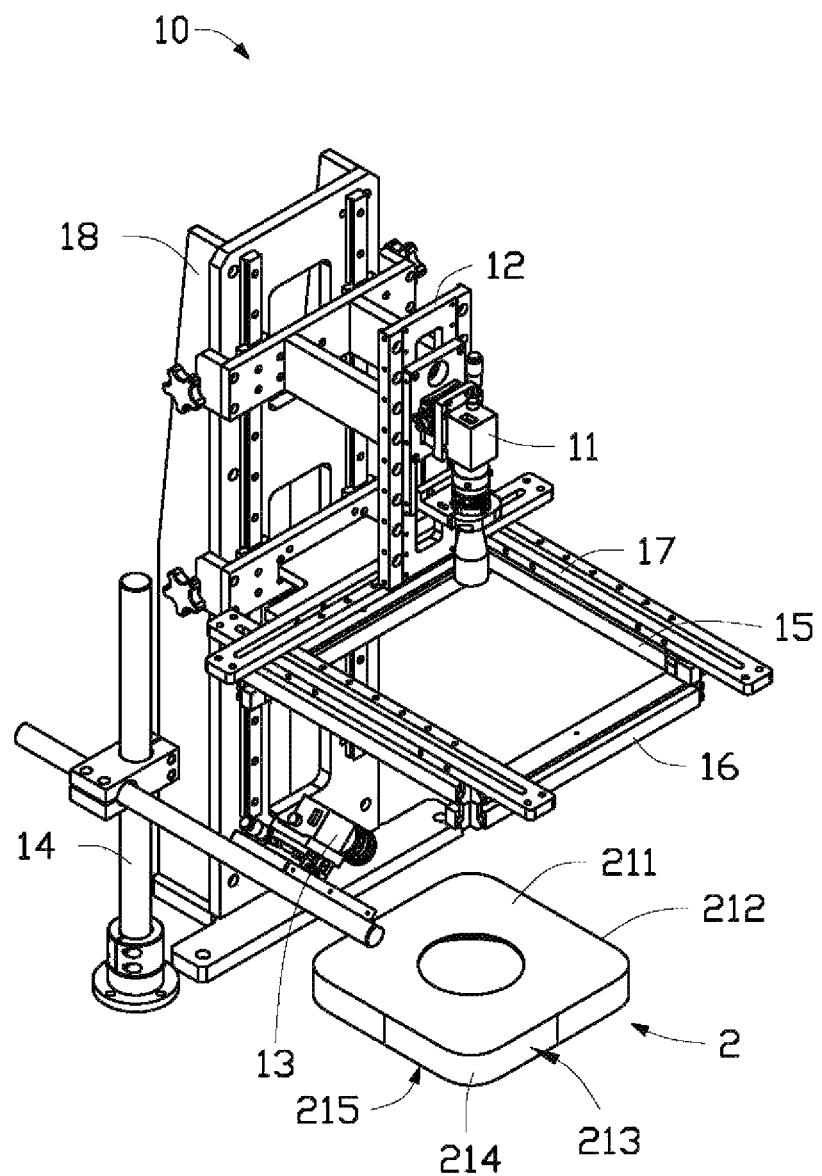
FIG. 3 is a schematic view of at least one embodiment of a first checking device.

Referring to FIG. 3, in at least one embodiment, the product 2 includes a plane 211, four edges 212 of the plane 211, three side surfaces 213, four corners 214, and a 3D surface 215.

The first checking device 1 includes, but is not limited to, a first camera device 11, a first camera bracket 12, a second camera device 13, a second camera bracket 14, at least one first white light source 15, at least one first red light source 16, a first light source bracket 17, and a first bracket 18. In at least one embodiment, the first camera device 11 is arranged on the first camera bracket 12, the second camera device 13 is arranged on the second camera bracket 14, the first white light source 15 and the first red light source 16 are arranged on the first light source bracket 17. The first camera bracket 12, the second camera bracket 14, and the first light source bracket are arranged on the first bracket 18.

Figure 4:
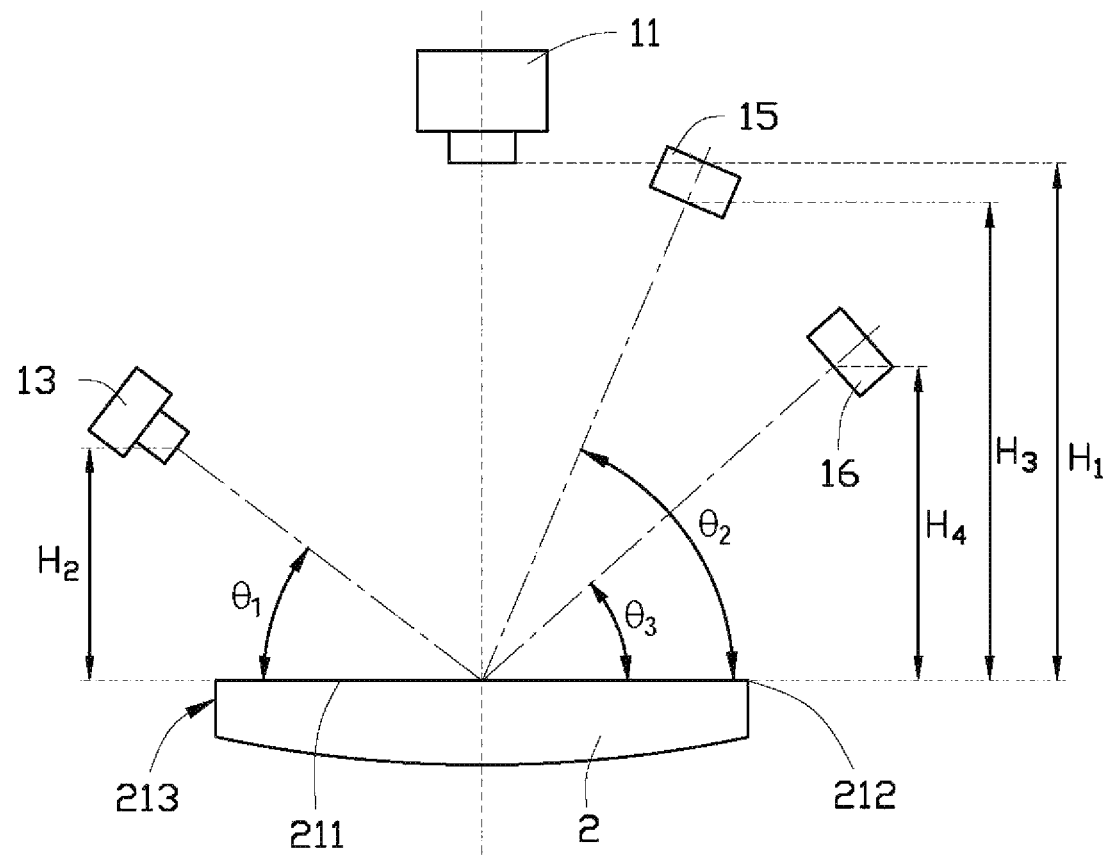
FIG. 4 is a schematic view of at least one embodiment of the component layout of the first checking device of FIG. 3.

Referring to FIG. 4, in at least one embodiment, when the robot arm 40 places the product 2 on the first checking device 10, the plane 211 of the product 2 faces the first camera device 11 and the second camera device 13. The first camera bracket 12 adjusts a position of the first camera device 11, and renders the first camera device 11 perpendicular to the plane 211, and renders a distance between the first camera device 11 and the plane 211 to be a first preset distance H1. The second camera bracket 14 adjusts a position of the second camera device 13, renders a distance between the second camera device 13 and the plane 211 to be a second preset distance H2, and renders an angle between the second camera device 13 and the plane 211 to be a first preset angle θ1.

The first light source bracket 17 adjusts positions of the first white light source 15 and the first red light source 16, renders a distance between the first white light source 15 and the plane 211 to be a third preset distance H3, and renders an angle between the first white light source 15 and the plane 211 to be a second preset angle θ2. The first light source bracket 17 further renders a distance between the first red light source 16 and the plane 211 to be a fourth preset distance H4, and renders an angle between the first red light source 16 and the plane 211 to be a third preset angle θ3.

In at least one embodiment, the first preset distance H1=d*[(a+b)/2], the second preset distance H2=e*[(a+b)/2], the third preset distance H3=f*[(a+b)/2], and the fourth preset distance H4=g*[(a+b)/2]. Therein a is a length value of the product 2, b is a width value of the product 2, and c is a height value of the product 2, d, e, f, g, θ1, θ2, and θ3 meet following requirements: 1.7<d<2, 0.8<e<1.1, 1.6<f<1.9, 0.7<g<0.9, 10°<θ1<50°, 30°<θ2<80°, and 20°<θ3<70°.

In at least one embodiment, the first camera device 11 can be an industrial camera with 12 million pixels, and a fixed-focus industrial lens with a focal length range of 7-10 mm is configured for use. The second camera device 13 can be an industrial camera with 8 million pixels, and a fixed-focus industrial lens with a focal length range of 6-9 mm is configured for use. The focal lengths of the first camera device 11 and the second camera device 13 can be calculated by an equation f=lens magnification*WD. WD is a working distance of the first camera device 11 and the second camera device 13. The first camera device 11 and the second camera device 13 have a minimum exposure time of 4700 μs and a maximum exposure time of 5000 μs.

The first checking device 1 further includes two first white light sources 16 and a first red light source 16. The first white light sources 15 and the red light source 16 are bar-shaped light sources, and their extension directions are in parallel with the plane 211 of the product 2. In at least one embodiment, the first white light sources 15 and the first red light source 16 have a minimum brightness of 7100 lm and a maximum brightness of 8100 lm.

In at least one embodiment, when the first white light sources 15 are activated, the second camera device 13 captures an image of the plane 211, the defects including the gas marks and the sand marks on the plane 211 are checked according to the image of the plane 211. When the first red light source 16 is activated, the first camera device 11 captures an image of each of the edges 212, and the defects including the stair slope errors and the scratches on the plane 211 are checked according to the images of the edges 212.

Figure 5:
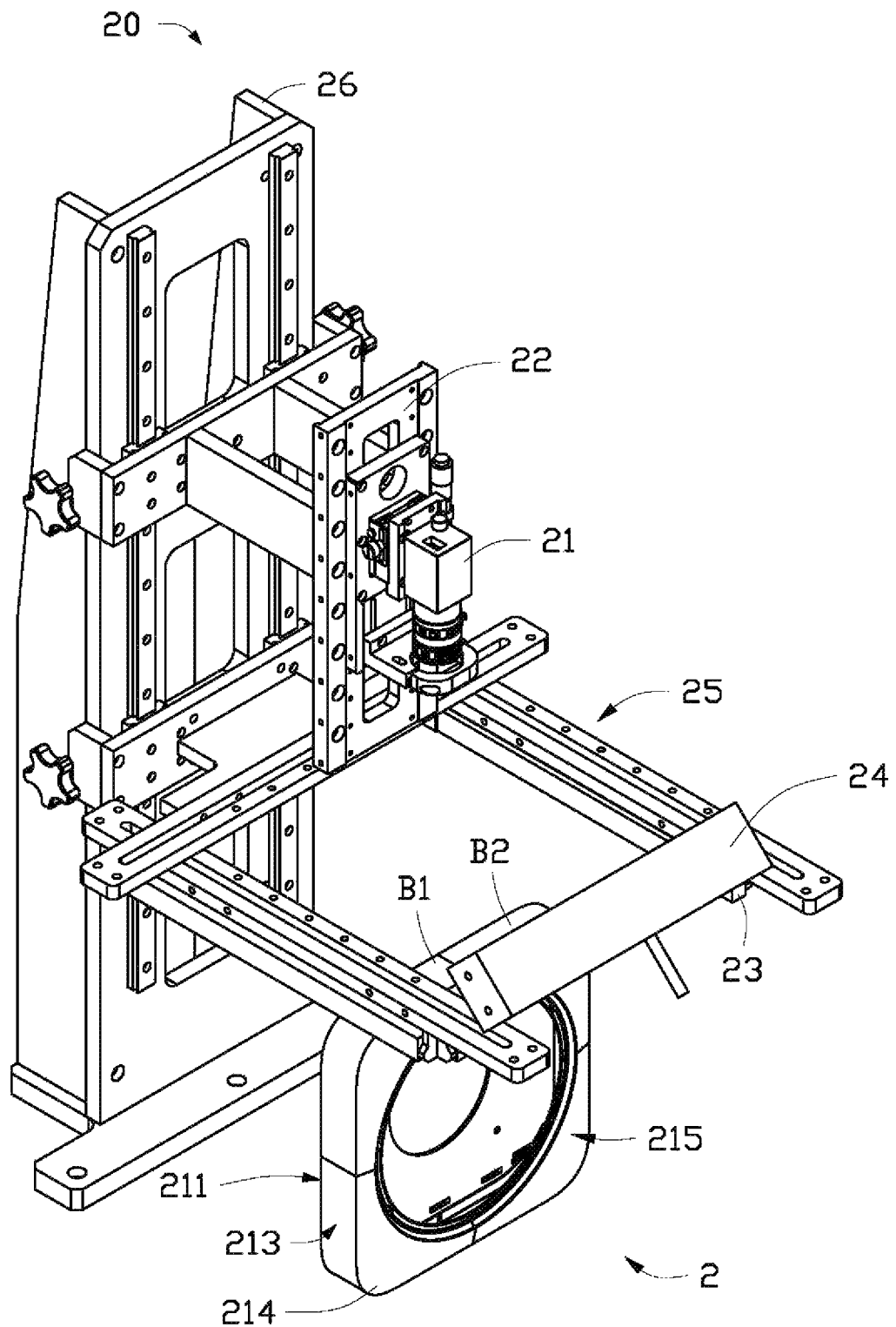
FIG. 5 is a schematic view of at least one embodiment of a second checking device.

Referring to FIG. 5, the second checking device 20 includes, but is not limited to, a third camera device 21, a third camera bracket 22, at least one second white light source 23, at least one second red light source 24, a second light source bracket 25, and a second bracket 26. In at least one embodiment, the third camera device 21 is arranged on the third camera bracket 22, the second white light source 23 and the second red light source 24 are arranged on the second light source bracket 25. The third camera bracket 22 and the second light source bracket 25 are arranged on the second bracket 26.

Figure 6:
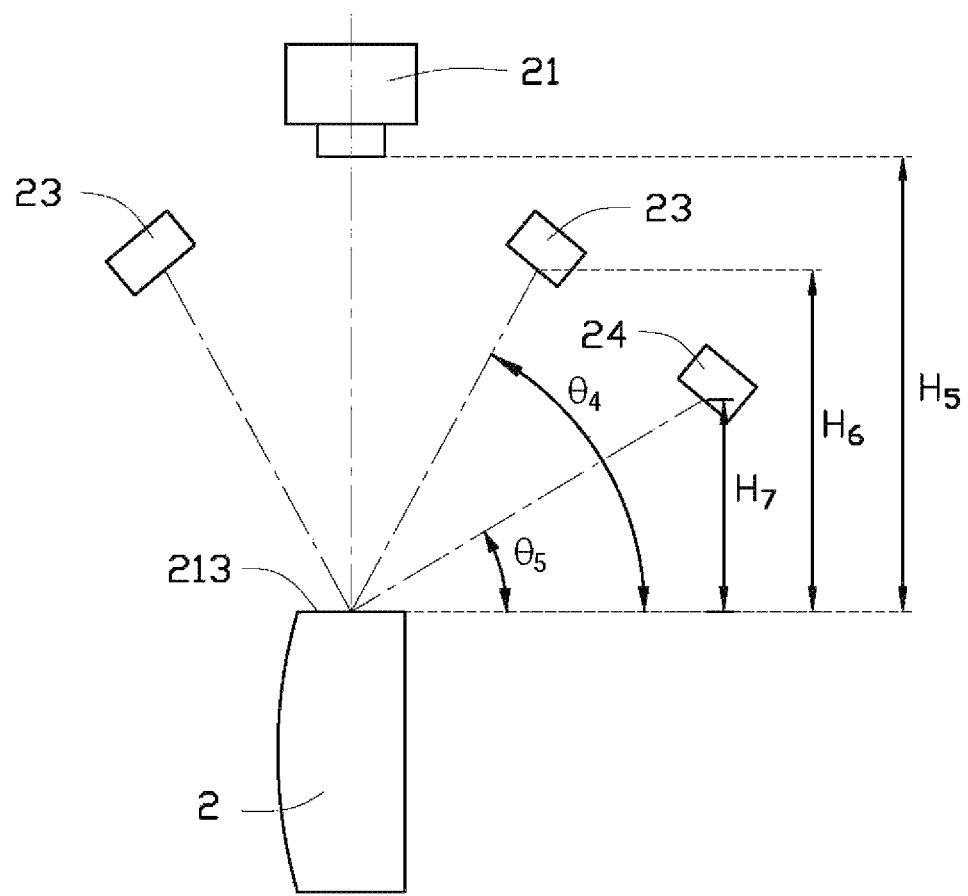
FIG. 6 is a schematic view of at least one embodiment of the component layout of the second checking device of FIG. 5.

Referring to FIG. 6, in at least one embodiment, when the robot arm 40 places the product 2 on the second checking device 20, the third camera device 21 faces one of the side surfaces 213 of the product 2. The third camera bracket 22 adjusts a position of the third camera device 21, renders the third camera device 21 perpendicular to the side surface 213, and renders a distance between the third camera device 21 and the side surface 213 to be a fifth preset distance H5.

The second light source bracket 25 adjusts positions of the second white light source 23 and the second red light source 24, renders a distance between the second white light source 23 and the side surface 213 to be a sixth preset distance H6, and renders an angle between the second white light source 23 and the side surface 213 to be a fourth preset angle θ4. The second light source bracket 25 renders a distance between the second red light source 24 and the side surface 213 to be a seventh preset distance H7, and renders an angle between the second red light source 24 and the side surface 214 to be a fifth preset angle θ5.

In at least one embodiment, the fifth preset distance H5=x*(a+b)/2], the sixth preset distance H6=y*[(a+b)/2], and the seventh preset distance H7=z*[(a+b)/2]. Therein x, y, z, θ4, and θ5 meet following requirements: 1.3<x<1.6, 0.3<y<0.6, 0.6<z<0.8, 30°<θ4<70°, and 20°<θ5<60°.

In at least one embodiment, the third camera device 21 can be an industrial camera with five-megapixels, and a fixed-focus industrial lens with a focal length range of 15-17 mm. The third camera device 21 has a minimum exposure time of 4400 μs and a maximum exposure time of 4800 μs.

The second checking device 20 further includes two second white light sources 23 and a red light source 24. The second white light sources 23 and the red light source 24 are bar-shaped light sources, and their extension directions are in parallel with the side surface 213 of the product 2. In at least one embodiment, the second white light sources 23 and the second red light source 24 have a minimum brightness of 6500 lm and a maximum brightness of 7600 lm.

In at least one embodiment, when the second white light sources 23 are activated, the third camera device 21 captures an image of each checkable area of the side surface 213, and an image of each corner 214 of the side surface 213, for checking for the defects including the abnormal colors, the stair slope errors, and the scratches on the side surface 213. When the second red light source 24 is activated, the third camera device 21 further captures an image of each checkable area of the side surface 213, for checking for the defects including the sanding marks on the side surface 213.

Figure 7:
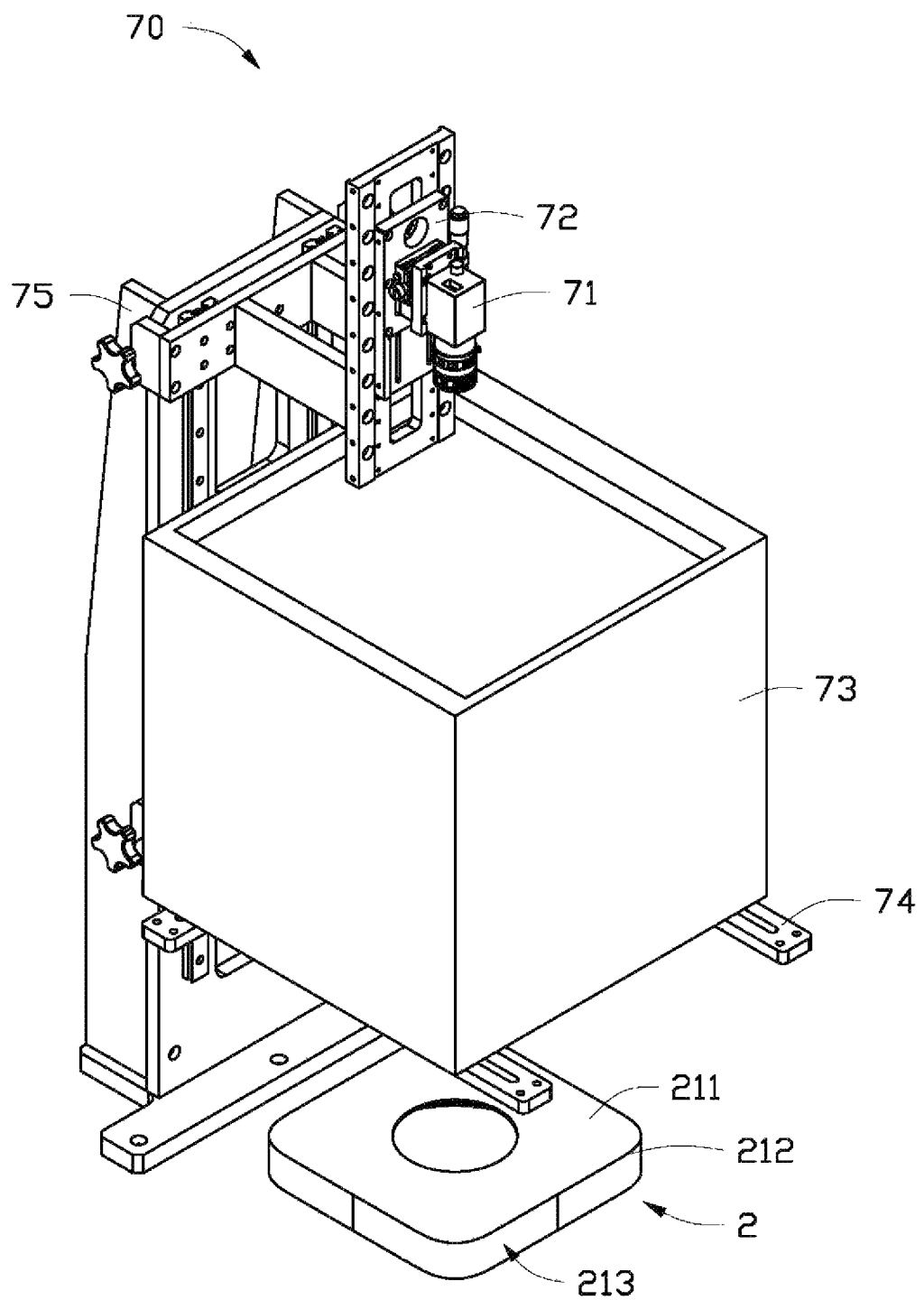
FIG. 7 is a schematic view of at least one embodiment of a third checking device.

Referring to FIGS. 1 and 7, the electronic device 1 further includes a third checking device 70. The third checking device 70 is arranged on the operation table 30, and checks for the defects including acid drips, dirt, corrosion spots, uneven dyeing, white spots, scratches, material discoloration, and watermarks on the plane 211 and the side surfaces 213.

The acid drip on the plane 211 is generally in a form of long shapes, with a light gray color and irregular directions. The dirt on the plane 211 is generally in a form of a block, similar to a mimeograph, and has a light color. The uneven dyeing on the plane 211 is generally in a flower-like form, and has a light white color. OREO spots on the side surface 213 appear that an upper ⅓ part and a lower ⅓ part of the side surface 213 have normal colors and a middle ⅓ part presents a sheet-like gray-white spot.

In at least one embodiment, the acid drip has a minimum length of 0.5 mm and a maximum length of 50 mm, and a minimum width of 0.5 mm and a maximum width of 10 mm. The dirt has a minimum diameter of 0.3 mm and a maximum diameter of 20 mm. The uneven dyeing has a minimum size of 0.05 mm and a maximum size of 8 mm. The OREO spots can have a minimum length of 20 mm and a maximum length of 200 mm, and a minimum width of 5 mm and a maximum width of 25 mm. These defects with above-mentioned sizes may be revealed by capturing and analyzing images of the plane 211 and the side surfaces 213 of the product 2.

The third checking device 70 includes, but is not limited to, a fourth camera device 71, a fourth camera bracket 72, a first coaxial light source 73, a third light source bracket 74, and a third bracket 75. The fourth camera device 71 is arranged on the fourth camera bracket 72, the first coaxial light source 73 is arranged on the third light source bracket 74, the fourth camera bracket 72 and the third light source bracket 74 are arranged on the third bracket 75.

Figure 8:
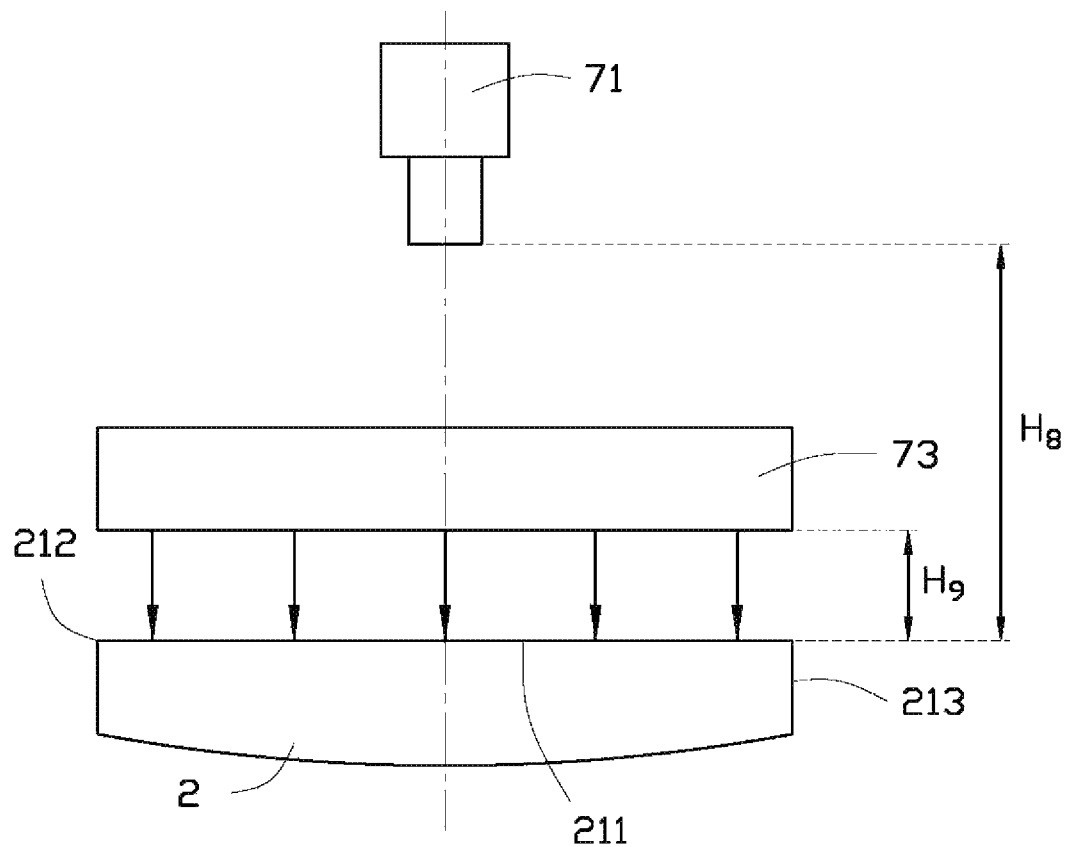
FIG. 8 is a schematic view of at least one embodiment of the component layout of the third checking device of FIG. 7.

Referring to FIG. 8, when the robot arm 40 places the product 2 on the third checking device 70, the fourth camera device 71 faces the plane 211. The fourth camera bracket 72 adjusts a position of the fourth camera device 71, renders the fourth camera device 71 perpendicular to the plane 211, and renders a distance between the fourth camera device 71 and the plane 211 to be an eighth preset distance H8. The third light source bracket 74 adjusts a position of the first coaxial light source 73, and renders a distance between the first coaxial light source 73 and the plane 211 to be a ninth preset distance H9.

In at least one embodiment, the eighth preset distance $H8=i*[(a+b)/2]$, and the ninth preset distance $H9=j*[(a+b)/2]$, therein i and j meet following requirements: $2.1<i<2.5$, $0.3<j<0.4$.

In at least one embodiment, the fourth camera device 71 can be an industrial camera with 12 million pixels, equipped with a fixed-focus industrial lens with a focal length range of 23-26 mm and a depth of 5-7 mm. A range of exposure times of the fourth camera device 71 is 4100-4900 μs. The color temperature range of the first coaxial light source 73 is 5000-6000K.

In at least one embodiment, when the first coaxial light source 73 is activated, the fourth camera device 71 captures images of the plane 211 and the side surface 213, for checking for the defects including the acid drips, the dirt, the corrosion spots, the uneven dyeing, the white spots, the scratches, the material discoloration, and watermarks on the plane 211 and the side surface 213.

Figure 9:
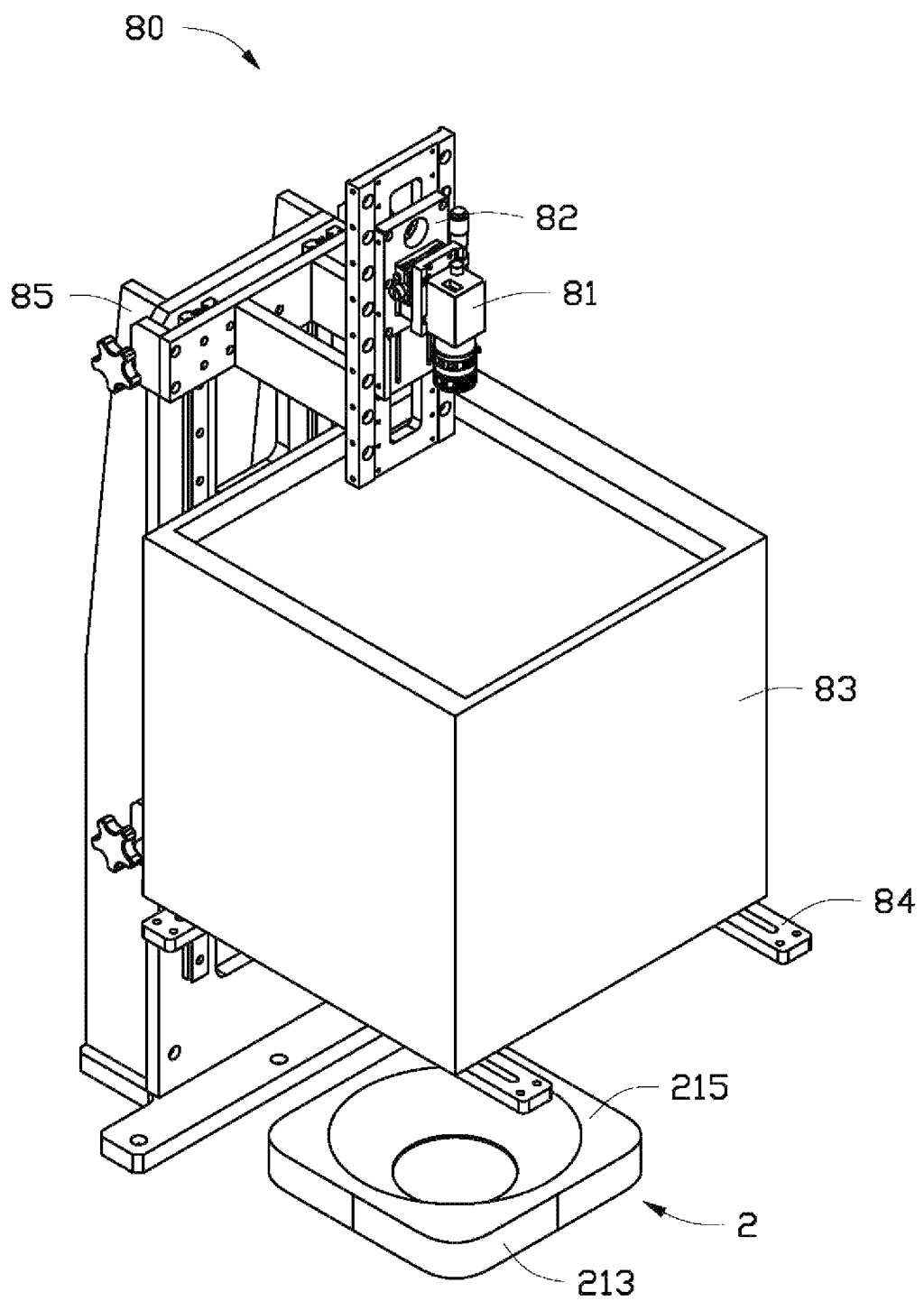
FIG. 9 is a schematic view of at least one embodiment of a fourth checking device.

Referring to FIGS. 1 and 9, the electronic device 1 further includes a fourth checking device 80. The fourth checking device 80 is arranged on the operation table 30, and checks for defects including acid drips, dirt, corrosion spots, uneven dyeing, white spots, material discoloration, and watermarks on the 3D surface 215.

Corrosion spots on the 3D surface 215 are generally in a form of pinpoints or dots, with a light gray color and irregular directions. The dirt on the 3D surface 215 is generally in a form of a block, similar to a mimeograph, and has a light color. Acid drips on the 3D surface 215 are generally in a form of water drops, having a light white color and irregular directions.

In at least one embodiment, the corrosion spot has a minimum size of 0.01 mm and a maximum size of 0.02 mm. Acid drip has a minimum length of 0.5 mm and a maximum length of 50 mm, and a minimum width of 0.5 mm and a maximum width of 10 mm. These defects with above-mentioned sizes may be revealed by capturing and analyzing the images of the 3D surface 215 of the product 2.

The fourth checking device 80 includes, but is not limited to, a fifth camera device 81, a fifth camera bracket 82, a second coaxial light source 83, a fourth light source bracket 84, and a fourth bracket 85. The fifth camera device 81 is arranged on the fifth camera bracket 82, the second coaxial light source 83 is arranged on the fourth light source bracket 84, and the fifth camera bracket 82 and the fourth light source bracket 84 are arranged on the fourth bracket 85.

Figure 10:
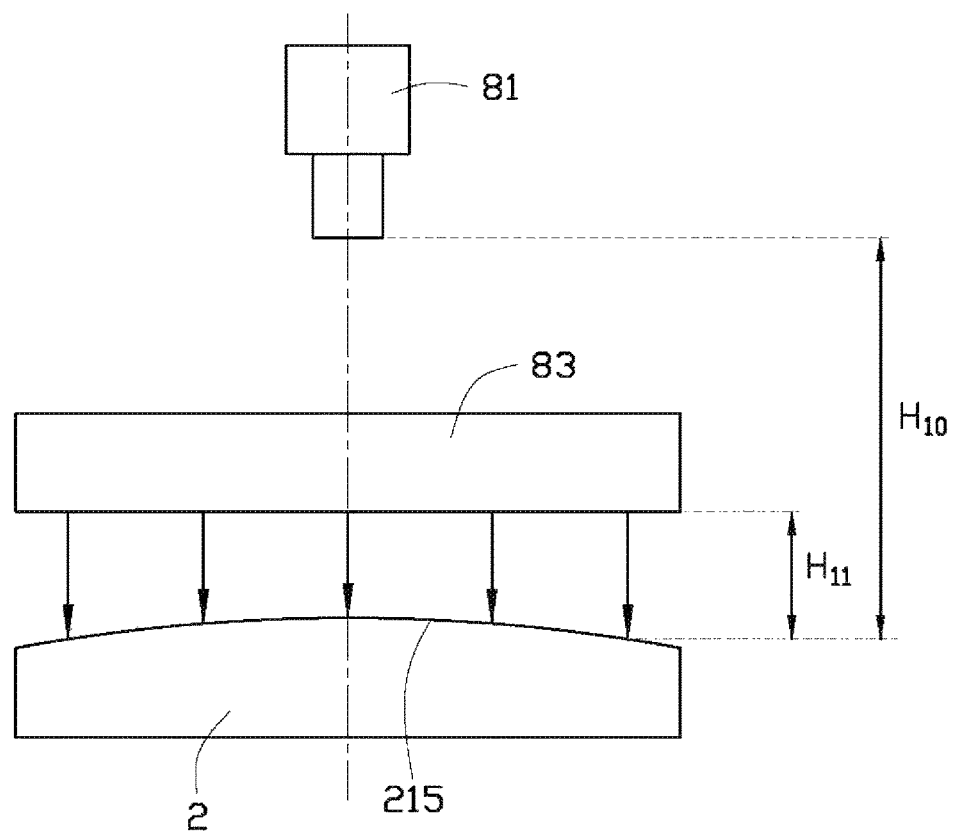
FIG. 10 is a schematic view of at least one embodiment of the component layout of the fourth checking device of FIG. 9.

Referring to FIG. 10, when the robot arm 40 places the product 2 on the fourth checking device 80, the fifth camera device 81 faces the 3D surface 215. The fifth camera bracket 82 adjusts a position of the fifth camera device 81, and renders a distance between the fifth camera device 81 and the 3D surface 215 to be a tenth preset distance H10. The fourth light source bracket 84 adjusts a position of the second coaxial light source 83, and renders a distance between the second coaxial light source 83 and the 3D surface 215 to be an eleventh preset distance H11.

In at least one embodiment, the tenth preset distance $H10=m*[(a+b)/2]$, and the eleventh preset distance $H11=n*[(a+b)/2]$, therein m and n meet following requirements: $1.8<m<2.2$, $0.1<n<0.2$.

In at least one embodiment, the fifth camera device 81 can be an industrial camera with 12 million pixels, equipped with a fixed-focus industrial lens with a focal length range of 33-37 mm and a depth of 3-5 mm. A range of exposure times of the fifth camera device 81 is 4600-5400 μs. The color temperature range of the second coaxial light source 83 is 5000-6000K.

In at least one embodiment, when the second coaxial light source 83 is activated, the fifth camera device 81 captures images of the 3D surface 215, for checking for defects including the acid drips, the dirt, the corrosion spots, the uneven dyeing, the white spots, the material discolorations, and the watermarks on the 3D surface 215.

As illustrated in FIG. 2, the electronic device 1 further includes an analysis device 91 and a display device 92. In at least one embodiment, the analysis device 91 can be a processor, and the display device 92 can be a display screen.

The analysis device 91 analyzes images captured by the first camera device 11, using an appearance defect neural network algorithm, so as to determine whether the defects including stair slope errors and scratches exist on the edges 212. The analysis device 91 further analyzes images captured by the second camera device 13 by same algorithm, so as to determine whether the defects including sanding marks and gas marks exist on the plane 211. The analysis device 91 further analyzes images captured by the third camera device 21 by the same algorithm, so as to determine whether the defects including abnormal colors, stair slope errors, scratches, and sanding marks exist on the side surface 213. The analysis device 91 further analyzes images captured by the fourth camera device 71 by the same algorithm, so as to determine whether the defects including acid drips, dirt, corrosion spots, uneven dyeing, white spots, scratches, material discolorations, and watermarks exist on the plane 211 and the side surface 213. The analysis device 91 further analyzes images captured by the fifth camera device 81 by the same algorithm, so as to determine whether the defects including acid drips, dirt, corrosion spots, uneven dyeing, white spots, material discoloration, and watermarks exist on the 3D surface 215.

The display device 92 displays a result of analysis made by the analysis device 91.

As illustrated in FIG. 1, the first checking device 10, the third checking device 70, the second checking device 20, and the fourth checking device 80 are arranged on the operation table 30 in order from left to right. The robot arms 40 are two in number.

The robot arm 40 places the product 2 on the first checking device 10 and the third checking device 70, when the first checking device 10 and the third checking device 70 are checking the appearance of the product 2 for defects, the robot arm 40 controls the product 2 to move and change its posture. When at least one defect is revealed by the analysis device 91, the robot arm 40 places the product 2 in the dividing mechanism 60. When no defect is revealed by the analysis device 91, the robot arm 40 transfers the product 2 to another robot arm 40. The other robot arm 40 places the product 2 on the second checking device 20 and the fourth checking device 80, and when the second checking device 20 and the fourth checking device 80 are checking the appearance of the product 2 for defects, the other robot arm 40 controls the product 2 to move and change the pose.

The positions of the first checking device 10, the second checking device 20, the third checking device 70, and the fourth checking device 80 are not limited by the illustrated figure, and can be adjusted according to requirements.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device for optically checking an appearance of a product for defects comprising:
   a first checking device checking for defects on a plane of a product, wherein the first checking device comprises a first camera device, a second camera device, at least one first white light source, and at least one first red light source, wherein the defects on the plane comprise stair slope errors, scratches, sanding marks, and gas marks, the first camera device is perpendicular to the plane, a distance between the first camera device and the plane is a first preset distance H1, a distance between the second camera device and the plane is a second preset distance H2, an angle between the second camera device and the plane is a first preset angle θ1, a distance between the first white light source and the plane is a third preset distance H3, an angle between the first white light source and the plane is a second preset angle θ2, a distance between the first red light source and the plane is a fourth preset distance H4, an angle between the first red light source and the plane is a third preset angle θ3; and
   a second checking device checking for defects on side surfaces of the product, wherein the second checking device comprises a third camera device, at least one second white light source, and at least one second red light source, wherein the defects on the side surfaces comprise abnormal colors, the stair slope errors, the scratches, and the sanding marks, the third camera device is perpendicular to one of the side surfaces, a distance between the third camera device and the side surface is a fifth preset distance H5, a distance between the second white light source and the side surface is a sixth preset distance H6, an angle between the second white light source and the plane is a second preset angle θ4, a distance between the second red light source and the side surface is a seven preset distance H7, an angle between the second red light source and the side surface is a fifth preset angle θ5;
   wherein when the at least one first white light source is activated, the second camera device captures an image of the plane, when the first red light source is activated, the first camera device captures an image of each of edges of the plane, when the at least one second white light source is activated, the third camera device captures images of the side surfaces and an image of each of corners of the side surface, when the second red light source is activated, the third camera device further captures images of each of the side surfaces;
   wherein the first preset distance H1=d*[(a+b)/2], the second preset distance H2=e*[(a+b)/2], the third preset distance H3=f*[(a+b)/2], the fourth preset distance H4=g*[(a+b)/2], the fifth preset distance H5=x*[(a+b)/2], the six preset distance H6=y*[(a+b)/2], and the seven preset distance H7=z*[(a+b)/2], a is a length value of the product, b is a width value of the product, d, e, f, g, x, y, z, θ1, θ2, θ3, θ4, and θ5 meet following requirements: 1.7<d<2, 0.8<e<1.1, 1.6<f<1.9, 0.7<g<0.9, 10°<θ1<50°, 30°<θ2<80°, 20°<θ3<70°, 1.3<x<1.6, 0.3<y<0.6, 0.6<z<0.8, 30°<θ4<70°, and 20°<θ5<60°.

2. The electronic device according to claim 1, further comprising:
   an operation table;
   a feed mechanism receiving the product to be checked; and
   a dividing mechanism receiving the product which has been checked and transmitting the product which has been checked to a next manufacturing process, wherein the first checking device and the second checking device are arranged on the operation table, the feed mechanism and the dividing mechanism are arranged on ends of the operation table, the feed mechanism and the dividing mechanism are conveyor belts.

3. The electronic device according to claim 1, further comprising:
at least one robot arm controlling the product to change posture when the first checking device and the second checking device checks the appearance of the product for defects, and controlling the product to move from the first checking device to the second checking device.

4. The electronic device according to claim 1, further comprising:
an analysis device determining whether the defects comprising the stair slope errors and the scratches exist on the edges of the product by analyzing the images captured by the first camera device according to an appearance defect neural network algorithm, determining whether the defects comprising the sanding marks and the gas marks exist on the plane of the product by analyzing the images captured by the second camera device, and determining whether the defects comprising the abnormal colors, the stair slope errors, the scratches, and the sanding marks exist on the side surfaces of the product by analyzing the images captured by the third camera device, wherein the analysis device is a processor; and
a display device displaying a result of analysis made by the analysis device, wherein the display device is a display screen.

5. The electronic device according to claim 1, further comprising:
a third checking device checking for defects comprising acid drips, dirt, corrosion spots, uneven dyeing, white spots, the scratches, material discoloration, and watermarks on the plane and the side surfaces of the product,
wherein the third checking device comprises a fourth camera device and a first coaxial light source, when the product is placed on the third checking device, the product is perpendicular to the fourth camera device and the first coaxial light source, a distance between the fourth camera device and the plane is an eighth preset distance H8, a distance between the first coaxial light source and the plane is a ninth preset distance H9, when the first coaxial light source is activated, the fourth camera device captures images of the plane and the side surfaces of the product;
wherein the eighth preset distance $H8=i*[(a+b)/2]$, and the ninth preset distance $H9=j*[(a+b)/2]$, i and j meet following requirements: $2.1<i<2.5$, $0.3<j<0.4$.

6. The electronic device according to claim 1, further comprising:
a fourth checking device checking for defects comprising acid drips, dirt, corrosion spots, uneven dyeing, white spots, material discoloration, and watermarks on a 3D surface of the product;
wherein the fourth checking device comprises a fifth camera device and a second coaxial light source, when the product is placed on the fourth checking device, the product faces the fifth camera device and the second coaxial light source, a distance between the fifth camera device and the 3D surface is a tenth preset distance H10, a distance between the second coaxial light source and the 3D surface is an eleventh preset distance H11;

wherein the tenth preset distance $H10=m*[(a+b)/2]$, and the eleventh preset distance $H11=n*[(a+b)/2]$, m and n meet following requirements: $1.8<m<2.2$, $0.1<n<0.2$.

7. The electronic device according to claim 1, wherein the first checking device further comprises a first bracket, a first camera bracket, a second camera bracket, and a first light source bracket, the first camera device is arranged on the first camera bracket, the second camera device is arranged on the second camera bracket, the first white light source and the first red light source are arranged on the first light source bracket, the first camera bracket, the second camera bracket, and the first light source bracket are arranged on the first bracket.

8. The electronic device according to claim 7, wherein when the product is placed on the first checking device, the plane of the product faces the first camera device and the second camera device, the first camera bracket adjusts a position of the first camera device, and renders the distance between the first camera device and the plane to be the first preset distance H1;
wherein the second camera bracket adjusts a position of the second camera device, renders the distance between the second camera device and the plane to be the second preset distance H2, and renders the angle between the second camera device and the plane to be the first preset angle θ1;
wherein the first light source bracket adjusts positions of the first white light source and the first red light source, renders the distance between the first white light source and the plane to be the third preset distance H3, renders the angle between the first white light source and the plane to be the second preset angle θ2, renders the distance between the first red light source and the plane to be the fourth preset distance H4, and renders the angle between the first red light source and the plane to be the third preset angle θ3.

9. The electronic device according to claim 1, wherein the second checking device further comprises a first bracket, a third camera bracket, and a second light source bracket, the third camera device is arranged on the third camera bracket, the second white light source and the second red light source are arranged on the second light source bracket, the third camera bracket and the second light source bracket are arranged on the second bracket.

10. The electronic device according to claim 9, wherein when the product is placed on the second checking device, one of the side surfaces of the product faces the third camera device, the third camera bracket adjusts a position of the third camera device, and renders the distance between the third camera device and the side surface to be the fifth preset distance H5;
wherein the second light source bracket adjusts positions of the second white light source and the second red light source, renders the distance between the second white light source and the side surface to be the sixth preset distance H6, renders the angle between the second white light source and the side surface to be the fourth preset angle θ4, renders the distance between the second red light source and the side surface to be the seventh preset distance H7, and renders the angle between the second red light source and the side surface to be the fifth preset angle θ5.

* * * * *